United States Patent

Jakszt et al.

[11] 4,228,478
[45] Oct. 14, 1980

[54] OVERVOLTAGE ARRESTER

[75] Inventors: Werner Jakszt; Klaus Reichelt; Gert Schiele, all of Berlin, Fed. Rep. of Germany

[73] Assignee: Siemens Aktiengesellschaft, Berlin & Munich, Fed. Rep. of Germany

[21] Appl. No.: 890,921

[22] Filed: Mar. 28, 1978

[30] Foreign Application Priority Data

Apr. 6, 1977 [DE] Fed. Rep. of Germany ... 7711213[U]

[51] Int. Cl.² .............................................. H02H 9/06
[52] U.S. Cl. .................................... 361/128; 315/36; 361/117
[58] Field of Search ............... 361/127, 128, 130, 126, 361/117, 131, 132; 315/36; 313/231.1

[56] References Cited
U.S. PATENT DOCUMENTS

| | | | |
|---|---|---|---|
| 971,935 | 10/1910 | Simon | 361/130 X |
| 1,171,598 | 2/1916 | Forest | 361/130 X |
| 1,217,452 | 2/1917 | Jackson | 315/36 X |
| 1,590,440 | 6/1926 | Pfiffner | 361/130 |
| 2,501,322 | 3/1950 | Ferguson et al. | 361/127 X |
| 3,018,406 | 1/1962 | Innis | 315/36 |
| 3,035,209 | 5/1962 | Smith, Jr. | 361/127 X |
| 3,727,108 | 4/1973 | Westrom | 361/127 |
| 3,777,219 | 12/1973 | Winters | 361/126 X |
| 4,161,012 | 7/1979 | Cunningham | 361/127 X |

Primary Examiner—Patrick R. Salce
Attorney, Agent, or Firm—Kenyon & Kenyon

[57] ABSTRACT

An overvoltage arrester wherein the arrester comprises an insulating housing which encloses a body of cast resin in which is embedded a voltage dependent resistor and a first connecting device, a portion of which protrudes from the resin body and extends out of the housing. The arrester is further provided with a spark gap formed as a separate unit and a second connecting device anchored to the spark gap, both of the latter elements also being disposed in the housing.

3 Claims, 1 Drawing Figure

U.S. Patent
Oct. 14, 1980
4,228,478
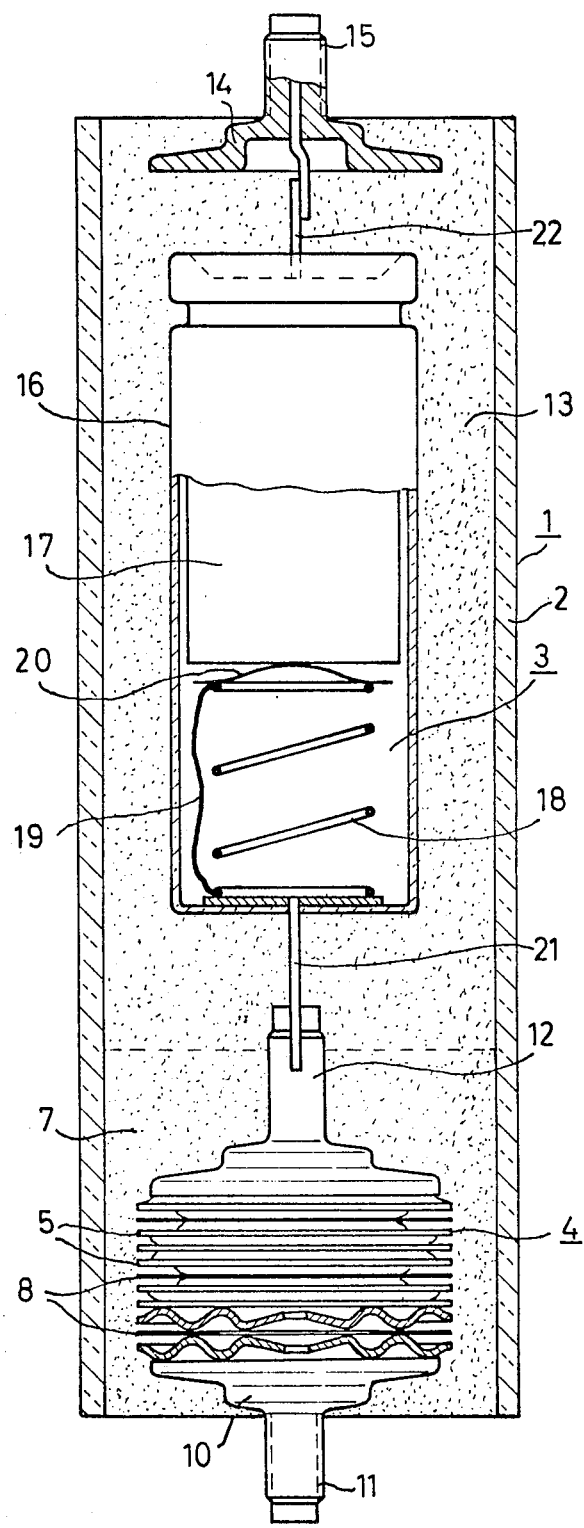

OVERVOLTAGE ARRESTER

BACKGROUND OF THE INVENTION

1. Field of the Invention

This invention relates to an overvoltage arrester for protecting electric machines and transformers wherein the arrester comprises an insulating housing and a series circuit disposed in the housing and including a spark gap and a voltage dependent resistor.

2. Description of the Prior Art

Typically, in overvoltage arresters of the above type, the insulating housing comprises a hollow insulator, for example, a porcelain tube, provided with exterior ribs (see, for example, German Auslegeschrift No. 20 56 526). Such an arrester configuration has also been used in cases wherein the voltage dependent resistor comprises zinc oxide (see, for example, German Offenlegungsschrift No. 23 34 420).

On the other hand, overvoltage arresters, particularly for use in networks with low operating voltages, are also known in which the effective elements thereof i.e., the voltage-dependent resistor and the spark gap, are embedded in a hardened cast-plastic compound which simultaneously serves as the arrester housing. In manufacturing this type of overvoltage arrester, a mold is required so that the cast body can be set in proper shape.

It is an object of the present invention to provide an improved overvoltage arrester.

SUMMARY OF THE INVENTION

In accordance with the principles of the present invention, the above and other objectives are accomplished in an overvoltage arrester wherein the arrester is provided with a separate insulating housing which encloses a body of hardened cast resin in which is embedded a voltage dependent resistor and a first connecting device, the latter device including a portion which protrudes from the resin body and extends out of the housing. The arrester is further provided with a spark gap formed as a separate unit and with a second connecting device anchored to the spark gap, both the spark gap and second connecting device also being enclosed by the housing.

With the arrester of the invention so formed, a separate mold for the resin body is unnecessary, as the arrester housing itself now serves as the mold. Moreover, with the present device, all fastening means for the active parts inside the housing are eliminated.

Advantageously, the arrester housing can be formed as a circular cylindrical plastic tube. In such case, it is further advantageous to make the outside diameter of the spark gap unit coincide with the inside diameter of the tube. This permits centering of the gap within the tube and sealing without having to use additionl means. The final attachment of the spark gap unit in the housing may also be advantageously accomplished in a simple manner by providing that the end of the inner electrical connection of the spark gap unit also be embedded in the cast resin body, thereby securing the spark gap unit in the housing. Additionally, the electrodes of the spark gap unit may likewise be embedded in a further cast resin body. This has the effect of completely removing the space between the electrodes from the influences of the ambient atmosphere.

It is also advisable to form the voltage-dependent resistor as a unit which is ready for assembly, i.e., in a separate housing which, in addition to the resistor body proper, also contains components serving for fastening and carrying current. In this manner, embedding of the resistor unit in the cast resin can be realized without there being contact between the resistor body and the cast resin.

BRIEF DESCRIPTION OF THE DRAWING

The above and other features and aspects of the present invention will become more apparent upon reading the following detailed description in conjunction with the accompanying sole drawing which illustrates in longitudinal cross section an overvoltage arrester according to the invention.

DETAILED DESCRIPTION

The overvoltage arrester 1 of FIG. 1 comprises a tubular housing 2 formed of a suitable plastic material. The latter housing encloses a voltage-dependent resistor assembly 3 and a spark gap unit 4.

The assembly 3 includes a cup-shaped housing 16 in which is disposed a resistor body 17 which is braced against the housing by a spring 18. The resistor body 17, preferably, may comprise an oxide-ceramic resistance material of known zinc oxide type. A contact cup 20 and current carrying ribbon 19 disposed in the housing 16 connect the resistor body 17 to a lower connecting tab 21 which protrudes from the housing 16 and is connected to a connecting device 12 of a spark gap unit 4. Another connecting tab 22 connected at the other end of resistor body protrudes from the upper portion of the housing 16 and connects to a further connecting device 14 which has a threaded nut 15 and which protrudes from the housing 2.

The voltage arrester assembly 3 is further embedded in a hardened cast resin body 13 which is disposed in the housing 2. Also embedded in the cast resin body 13 are the tabs 21 and 22, the portion of the connecting device 14 which extends into the housing 2, and the top end of the connecting device 12.

The spark gap unit 4 of the arrester 1 comprises several electrodes 5 arranged in spaced series so that the field therebetween is substantially uniform. These electrodes are shown diagrammatically in the FIGURE and are referred to as so-called sheaves. Disposed between the electrodes 5 are insulating washers 8.

The electrodes 5 and washers 8 are embedded in a further cast resin body or resin block 7 which also supports an outer connecting device 10 having a threaded stud 11, as well as all but the top end of the connecting device 12. The outside diameter of the resin block 7 of the spark gap unit 4 corresponds to or coincides with the inside diameter of the housing 2, so that the spark gap unit 4 can be easily introduced into the housing 2 for assembly without excessive friction.

For overvoltage arresters of different quenching voltages, active elements (i.e., the resistor assembly 3 and spark gap unit 4) of different lengths but of substantially the same diameter can be used. The other members of the arrester particularly the connecting devices, can be used without change.

Overvoltage arresters designed in accordance with the present invention can be suitably used to protect electric machines, transformers and similar operating units operating at medium operating voltages against stresses which can occur particularly during switching with vacuum switchgear. As a result, damage to the windings of these operating units can be prevented. Moreover, because of their small dimensions, the overvoltage arresters of the present invention can be installed directly into vacuum switchgear as, for example, vacuum contactors. In this manner, the operating units are ensured of protection immediately upon installation of the switchgear.

What is claimed is:

1. An overvoltage arrester for use in protecting machines and transformers comprising:
    an insulating housing;
    a voltage dependent resistor in said housing;
    a first connecting device connected to said resistor and having a protruding portion which extends out of said housing;
    a spark gap, formed as a separate unit, disposed in said housing, and having an outer diameter which corresponds to the inner diameter of the housing, said spark gap comprising a body of hardened cast resin in which a plurality of electrodes, a plurality of spacer washers arranged between said electrodes, and another connecting device are embedded; and
    a body of resin cast in said housing and on said spark gap in which said resistor body of a portion of said first connecting device are embedded.

2. An overvoltage arrester in accordance with claim 1 wherein:
    said housing comprises a circular cylindrical plastic tube.

3. An overvoltage arrester in accordance with claim 1 wherein:
    said voltage dependent resistor comprises: a further housing;
    a voltage dependent resistor arranged in said further housing; and contact elements arranged on opposite
    sides of said voltage dependent resistor.

* * * * *